No. 897,208. PATENTED AUG. 25, 1908.
J. L. KALMBACHER.
LOCK NUT.
APPLICATION FILED AUG. 9, 1907.

WITNESSES
H. R. Wrigle
Joseph Schenk

INVENTOR
Johannes L. Kalmbacher
By Robt. Klotz
Atty.

UNITED STATES PATENT OFFICE.

JOHANNES LUDWIG KALMBACHER, OF CHICAGO, ILLINOIS.

LOCK-NUT.

No. 897,208.  Specification of Letters Patent.  Patented Aug. 25, 1908.

Application filed August 9, 1907. Serial No. 387,757.

*To all whom it may concern:*

Be it known that I, JOHANNES LUDWIG KALMBACHER, a subject of the Emperor of Germany, and residing at Chicago, in the county of Cook and State of Illinois, have invented a new and useful Improvement in Lock-Nuts, of which the following is a complete specification.

This invention relates to improvements in lock-nuts and more particularly to a lock-nut of that class in which the nut is locked to the washer.

The object in this invention is to provide a lock-nut capable of locking itself against rotation caused by jar or vibrations of the bolt, but which may be freely turned in either direction by any ordinary wrench or other implement usually used for that purpose.

It is also an object of the invention to provide a very cheap and simple device capable of being used upon old bolts as well as new, it only being necessary to provide a flattened surface on one side of the threaded portion of the bolt.

It is further an object of the invention to provide a lock-nut in which the parts are reduced to a minimum, thereby greatly lessening the liability to get out of repair.

The invention consists of the matters hereinafter described in the specification and more fully pointed out and defined in the appended claims.

Figure 1:
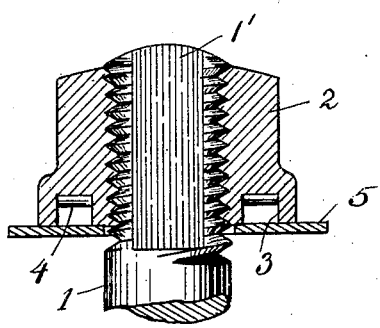
Figure 3:
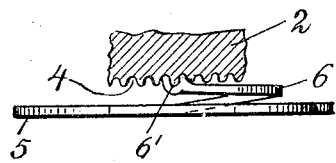
Figure 2:
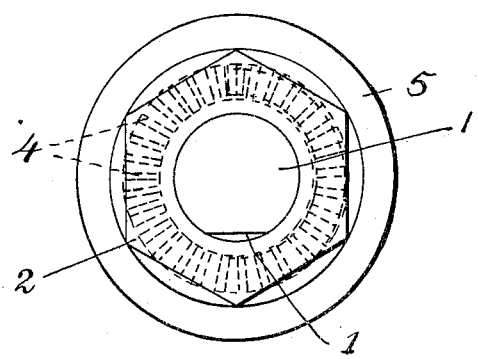
Figure 4:
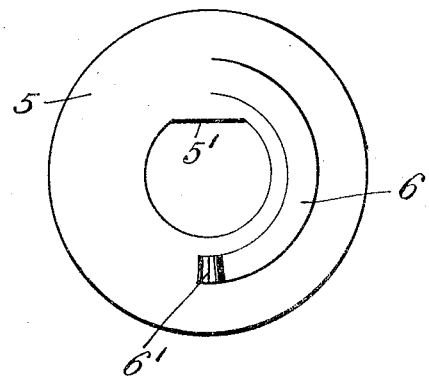

In the drawings: Figure 1 is a view, partly in section and partly in side elevation, of the lock-nut attached to a bolt. Fig. 2 is a top plan view of the same. Fig. 3 is a side elevation of the washer and showing a fragmentary section of the nut. Fig. 4 is a top plan view of the washer.

As shown in said drawings. 1 indicates the bolt, which is provided longitudinally of its threaded portion with a flattened surface 1'. In the case of new bolts, said flattened surface may be formed in any desired manner when the bolt is made, and where it is desired to use old bolts the bolts may be filed or otherwise cut down to the proper shape.

The nut 2 may be of any ordinary construction, but as shown it is hexagonal at its outer end and round at its inner end, the latter of which is slightly larger than the former. In the inner end or face of said nut and concentric with the bore thereof is an annular groove or channel 3, which at its bottom is provided with a plurality of rounded teeth 4, the purpose of which will be hereinafter more fully described.

A washer 5 is placed on the bolt and against which the inner face of the nut abuts. Said washer is provided with a central aperture, one side of which, 5', is straight and fits on the flattened surface 1' of the bolt, thereby preventing the washer from turning.

A resilient tongue 6 is stamped or otherwise integrally formed in said washer, concentric with the bore thereof, and is provided on its free end with a claw 6' adapted to engage the teeth 4 of the bolt. Said tongue projects from the face of the washer adjacent the nut, and as it is formed on a circle coincident with that of the groove 3, it is free to project into said groove to engage the teeth.

The operation is as follows: When the washer is placed on the bolt it is prevented from turning by the straight edge thereof engaging the flat surface of the bolt. When the nut is set up against the washer the tongue 6 enters the groove in the nut and the claw 6' engages the teeth 4. Inasmuch as said teeth are rounded they can be forced over the claw in either direction but the claw engages said teeth with sufficient force to prevent the nut turning by reason of jar or vibrations.

Obviously many details of construction may be varied without departing from the principles of my invention.

I claim as my invention:

In a device of the class described the combination with a bolt having its threaded end flattened on one side, of a nut having an annular groove in its inner face, teeth in said groove, a washer having a flat face in its bore adapted to engage the flat face of the bolt. and hold the washer from rotation on the bolt, a tongue on said washer, curved concentrically with said groove and extending approximately half way around the bolt, and a claw on the inner face of said tongue adapted to engage said teeth but to slip over the same when the nut is turned in either direction.

In witness whereof I have hereunto subscribed my name in the presence of two witnesses.

JOHANNES LUDWIG KALMBACHER.

Witnesses:
 CARL HAERTING,
 H. R. WEIGLE.